L. C. TRENT.
APPARATUS FOR SEPARATING SOLIDS FROM LIQUID SOLUTIONS.
APPLICATION FILED JUNE 12, 1912.

1,056,233.

Patented Mar. 18, 1913.

2 SHEETS—SHEET 1.

Witnesses.

Inventor,
L. C. Trent

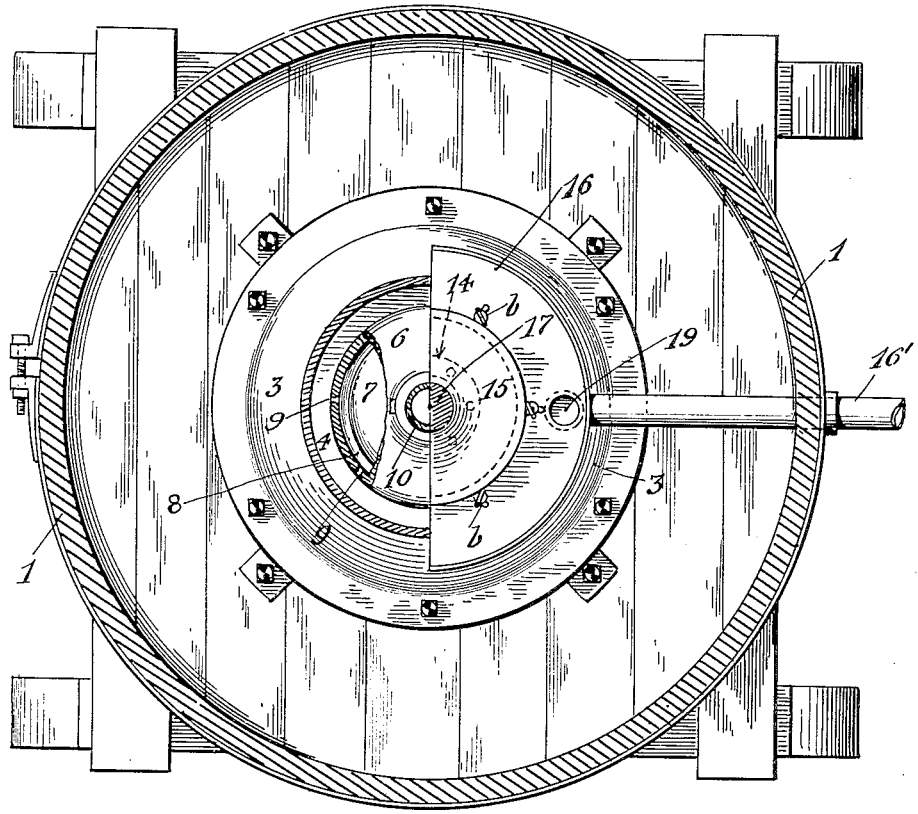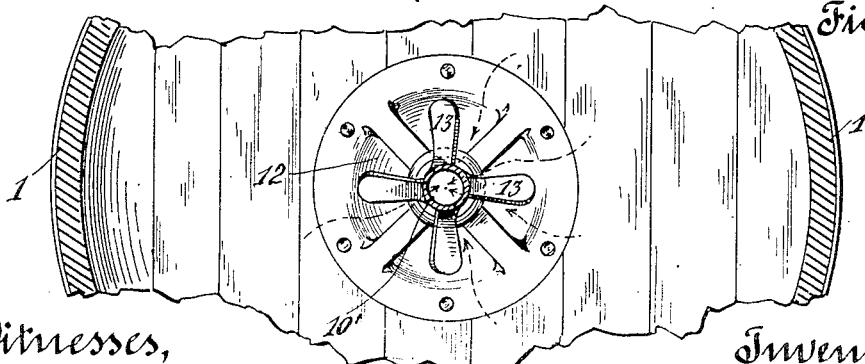

UNITED STATES PATENT OFFICE.

LAMARTINE C. TRENT, OF LOS ANGELES, CALIFORNIA.

APPARATUS FOR SEPARATING SOLIDS FROM LIQUID SOLUTIONS.

1,056,233.  Specification of Letters Patent.  Patented Mar. 18, 1913.

Application filed June 12, 1912. Serial No. 703,209.

*To all whom it may concern:*

Be it known that I, LAMARTINE C. TRENT, a citizen of the United States, residing at Los Angeles, in the county of Los Angeles and State of California, have invented certain new and useful Improvements in Apparatus for Separating Solids from Liquid Solutions, of which the following is a specification.

The hereinafter described invention is designed for the separation under pressure of solids from liquid solutions, as, for instance, recovering the carbon from the liquid solution flowing from the gas scrubbers of gas works, the separation of the heavier or coarser solids from the liquid flow from a stamp mill, the removal of the slimes from cyanid solutions, and, in fact, the apparatus is applicable for the removal of the solids from liquid and semi-liquids generally; the object of the invention being the construction of an apparatus which will permit of the work of separating the solids from the solution to be treated to be carried out as a continuous operation, *i. e.* a continuous inflowing stream of the liquid from which the solids are to be separated may be maintained throughout the work of separation, the centrifugal of which is at all times submerged within the liquid or solution under treatment and primed automatically for operation, the construction of the centrifugal being such that the supply of liquid thereto is through an under feed and in proportion to the removal of the solids therefrom and the discharge of the liquid.

To comprehend the invention, reference should be had to the accompanying sheet of drawings, wherein—

Figure 1:
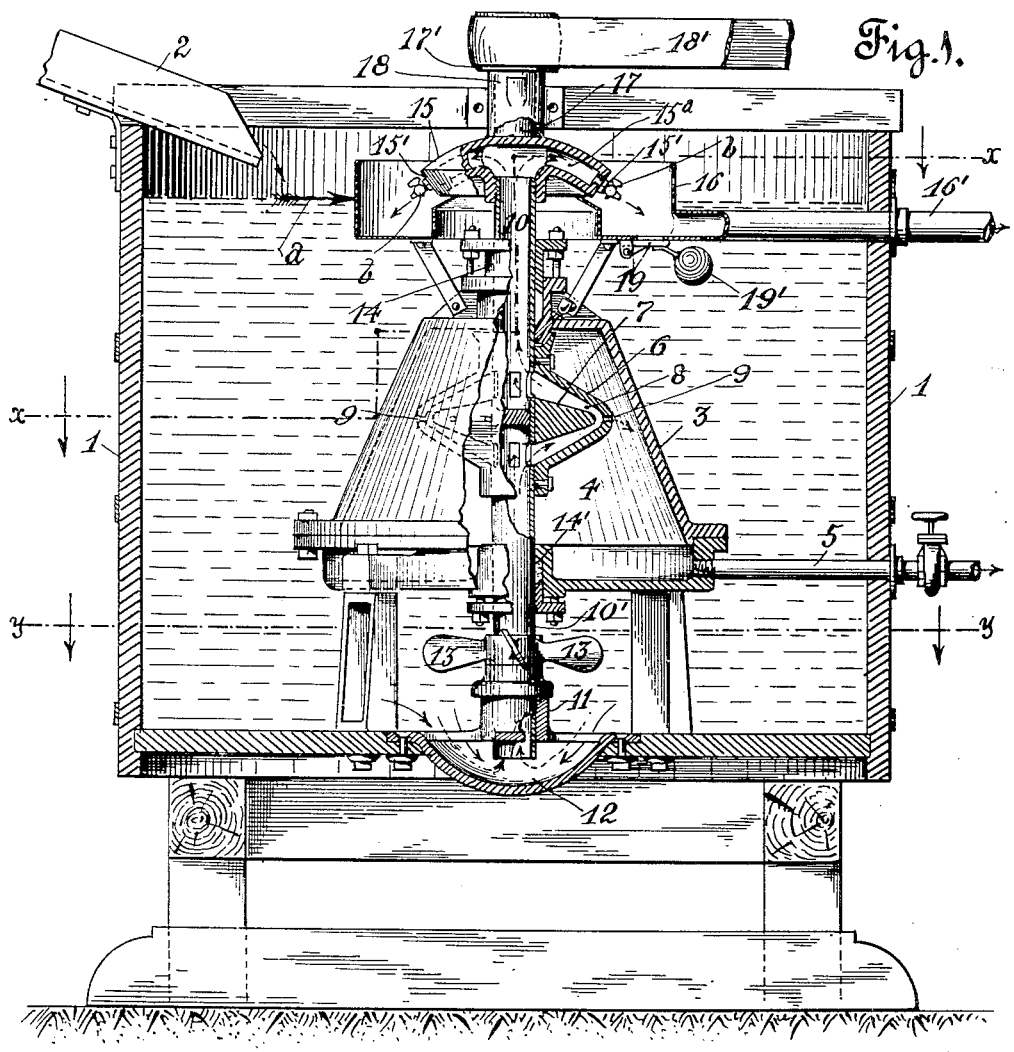
Figure 3:
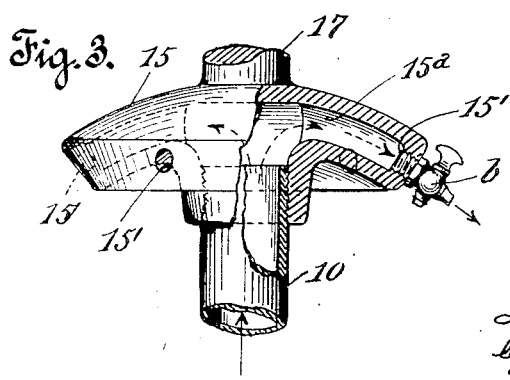

Figure 1 is a vertical sectional view of the apparatus. Fig. 2 is a sectional plan view taken on line *x—x*, Fig. 1 of the drawings. Fig. 3 is a detail view of one of the controlled outlets for the vacuum chamber of the centrifugal. Fig. 4 is a sectional view taken on line *y—y*, Fig. 1.

In the drawings, the numeral 1 is used to indicate any suitable form of a receiving vessel, preferably cylindrical in construction for the reception of the material to be treated, and into which the liquid or semi-liquid material from which the solids are to be separated is delivered by the feed or supply runway 2, the said receiving vessel being an open top one.

Within the receiving vessel 1 is rigidly sustained, in any suitable manner, a conical casing or housing 3, the interior of which forms a pressure chamber 4 for the reception of the solids separated from the liquid under treatment, the said casing 3 being held a slight distance above the bottom of the vessel 1 and from the same leads a discharge pipe 5 extended beyond the vessel 1 for conveying the separated solids to any suitable place of deposit.

Within the conical casing 3 works the centrifugal member 6, the interior of which is sub-divided by a horizontal diaphragm 7 of slightly less diameter than the interior of the centrifugal member 6 in order to provide a contracted annular passage-way 8 for the up-flow of the liquid from which the solids have been separated, and the said centrifugal member 6 is provided with a series of contracted peripheral outlets 9 through which the solids are forced into the chamber 4 of the casing 3. The said centrifugal member is supported by a hollow drive shaft 10, the extension 10′ of which is open at its lower end and extends within a suitable bearing 11 upwardly projected from the depressed central portion 12 of the bottom of the receiving vessel 1, and to the said downwardly extended portion or extension 10′ of the hollow drive shaft 10 the agitating blades 13 are secured for maintaining the material to be treated in an agitated condition as drawn into the lower open end of the said extension 10′, which said extension constitutes a feed supply for the centrifugal member 6.

The hollow drive shaft 10 and its feed extension 10′ extend respectively through stuffing glands 14 and 14′ of the conical casing 3, and the upper end of the said drive shaft 10 terminates in a hollow disk 15 which is provided with a series of valve controlled peripheral outlets 15′, which discharge the liquid freed of its solids into a launder 16 surrounding the same and from which the liquid escapes through the outlet runway 16′ to a suitable place of deposit. The said hollow disk 15 constitutes a vacuum pump, into the vacuum chamber 15ᵃ of which the clear or free liquid is drawn from the centrifugal member 6 through the tubular drive shaft 10. As a matter of fact, the member 6, shaft 10 and the extension 10' thereof together with the member 15 may be said to constitute the centrifugal of the apparatus, the member 6 of which may be treated as an accumulator for the material to be treated.

From the disk 15 and centrally thereof projects a short shaft 17 carrying a drive pulley 17', the shaft 17 working in an overhead bearing 18, and rotation is imparted to the shaft 17 and the rotatable parts connected thereto by means of a drive belt 18' working over the belt pulley 17', the said belt 18' being driven from any suitable source of power. It will be understood that any other suitable and well known form of power transmitting mechanism may be employed for imparting rotary motion to the shaft 17, although preference is given to the form of drive mechanism shown and described owing to the simplicity thereof.

Under working conditions the material to be treated is delivered into the receiving vessel 1 until it reaches a depth therein indicated by arrow $a$, which entirely submerges the rotatable features of the apparatus, the pressure of the material as fed into the receiving vessel 1, causing an upflow thereof into the centrifugal until it reaches a level therein equal to the level of the material within the receiving vessel 1, so that the centrifugal is at all times primed with solution for treatment to a point equal to the level within the stationary receiving vessel 1. The object is to keep the centrifugal primed to a height within the vacuum chamber 15ª equal to the level of the material within the receiving vessel 1 indicated by the arrow $a$, and in case the level of the material for treatment falls below the launder 16, then the valve 19, which is controlled in its movement by the float 19' will automatically open and permit a quantity of the treated liquid discharging into the launder 16 to flow into the receiving vessel 1 until the material therein has been raised to its proper level. During the working of the apparatus the centrifugal is driven at a high rate of speed, the flow of the material through the accumulator 6 being retarded by the diaphragm 7 therein, and under the influence of the generated centrifugal strains the material is directed outwardly toward the contracted peripheral outlets 9, through which the solids contained within the liquid solution are gradually forced and escape under pressure into the chamber 4 of the fixed conical casing or housing 3, being gradually discharged therefrom through the discharge outlet pipe 5 to a suitable place of deposit beyond the receiving vessel 1, while the liquid from which the solids have been removed escape through the annular passage-way 8 and flow upwardly through the hollow shaft 10 into the chamber 15ª of the vacuum pump 15, being drawn therein by reason of the high rotative speed at which the centrifugal is driven. The clear liquid flowing into the chamber 15ª of the vacuum pump 15 is discharged therefrom through the peripheral outlets 15' thereof, the flow from which outlets is controlled by the regulating valves $b$, so that the outflow from the said pump may be readily proportioned to the outflow of the separated solids.

The liquid to be treated is automatically drawn into the centrifugal through the submerged open end of the extension 10', the feed being an under one and the inflow of the solution into the receiving vessel 1 proportioned to the outflow of the solids and the clear liquid from the centrifugal, so that the inflow of liquid into the vessel 1 offsets the outflow of the solids and treated liquid, and the intent is that the inflow of the solution to be treated shall be a continuous one throughout the working of the apparatus.

When the machine is at rest, the pressure of the liquid within the receiving vessel is sufficient to maintain the material within the centrifugal at a level equal to that within the vessel 1, so that the centrifugal is at all times primed for instant operation for the separation of the solids from the liquid. During the working of the apparatus the agitator blades 13 secured to the extension 10' of the centrifugal maintain the material in a condition of agitation and thoroughly intermixed for an infeed into the centrifugal.

By the use of the described invention, a clean mechanical separation of the solids from the liquids is obtained, the discharge of the solids and the clear liquid, at different points, being proportioned to the inflow of the liquid to be treated, the apparatus being capable of handling a large tonnage per day, and the flow of the liquid to be treated and the outflow of the solids and treated liquid being a continuous one.

The apparatus is especially designed and intended for a close working for the separation and removal of exceedingly fine solids from the liquids generally, in order that the liquid treated may be discharged as clear liquid, i. e. liquid freed of its solids.

The essential features of the apparatus reside in delivering the material or liquid to be treated into a submerged centrifugal from an open under feed, the proportioning of the outflowing treated liquid to the inflowing liquid for treatment, and in the provision made for a continuous treatment of the material.

When the inflow of material to be treated is cut off, the centrifugal continues its working action until all solids have been removed from the material contained within the receiving vessel. However, for this working it is required that a uniform supply of liquid be delivered thereto in order to maintain the efficiency of the vacuum pump. Inasmuch as the float 19' operates to open the hinged valve 19 within the launder 16 on the liquid level falling below the bottom of the said launder 16, the clear liquid delivered therein from the vacuum pump 15 will flow back into the receiving vessel 1 to resupply liquid to the material therein to prevent the undue thickening thereof, thereby maintaining the liquid consistency of the material until finally disposed of and withdrawing the remaining solids from the receiving vessel 1.

Having thus described the invention what is claimed as new and desired to be protected by Letters Patent is—

1. An apparatus for separating solids from liquids, the same comprising a stationary receiving vessel for the liquid to be treated, a casing or housing fixed within the said vessel and provided with a discharge outlet extended beyond the said vessel, a centrifugal mounted therein and consisting of an accumulator provided with peripheral outlets rotatably held within the fixed casing or housing, an open bottomed tubular feed extension projected beyond the same for delivering material from the vessel into the accumulator, a diaphragm within the accumulator, a hollow shaft for receiving the treated liquid from within the accumulator, and a vacuum pump provided with a controlled outlet for receiving the treated liquid from said shaft, and means for imparting rotation to the said centrifugal.

2. An apparatus for separating solids from liquids, the same comprising a stationary receiving vessel for the liquid to be treated, a casing or housing fixed within the said vessel and provided with a discharge outlet extended beyond the said vessel, a centrifugal mounted therein and consisting of an accumulator provided with peripheral outlets rotatably held within the fixed casing or housing, an open bottomed tubular feed extension projected beyond the same for delivering material from the vessel into the accumulator, a diaphragm within the accumulator, a hollow shaft for receiving the treated liquid from within the accumulator, and a vacuum pump provided with a controlled outlet for receiving the treated liquid from said shaft, a launder surrounding said vacuum pump for receiving the liquid discharged therefrom and conveying the same to a suitable place of deposit, and means for imparting rotation to the said centrifugal.

3. An apparatus for separating solids from liquids, the same comprising a stationary receiving vessel for the liquid to be treated, a casing or housing fixed within the said vessel and provided with a discharge outlet extended beyond the said vessel, a centrifugal mounted therein and consisting of an accumulator provided with peripheral outlets rotatably held within the fixed casing or housing, an open bottomed tubular feed extension projected beyond the same for delivering material from the vessel into the accumulator, a diaphragm within the accumulator, a hollow shaft for receiving the treated liquid from within the accumulator, and a vacuum pump provided with a controlled outlet for receiving the treated liquid from said shaft, a launder surrounding said vacuum pump for receiving the liquid discharged therefrom and conveying the same to a suitable place of deposit, a valve within said launder, means for controlling the movement of said valve for permitting a flow of liquid therefrom into the receiving vessel on the level of the liquid therein falling beyond a given point, and means for imparting rotation to the said centrifugal.

4. An apparatus for separating solids from liquids, the same comprising a stationary receiving vessel for the liquid to be treated, a casing or housing fixed within the said vessel and provided with a discharge outlet extended beyond the said vessel, a centrifugal mounted therein and consisting of an accumulator provided with peripheral outlets rotatably held within the fixed casing or housing, an open bottomed tubular feed extension projected beyond the same for delivering material from the vessel into the accumulator, a diaphragm within the accumulator, a hollow shaft for receiving the treated liquid from within the accumulator, and a vacuum pump provided with a controlled outlet for receiving the treated liquid from said shaft, a means for imparting rotation to the said centrifugal, and agitating means carried by the feed extension for the accumulator for maintaining the liquid drawn therein in a condition of agitation.

5. In an apparatus for separating solids from solutions, the same comprising a stationary vessel for the liquid to be treated, a centrifugal mounted therein and provided with an under feed for drawing therein the liquid material to be treated, peripheral outlets through which the solids are ejected, means for receiving the solids and conveying the same to a place of deposit beyond the stationary vessel, and vacuum creating means for withdrawing the separated liquid from the centrifugal and delivering the same to a suitable place of deposit.

6. In an apparatus for separating solids from liquid material, the same comprising a receiving vessel for the liquid to be treated, a centrifugal mounted therein and provided with peripheral outlets for the discharge of solids therefrom, means for delivering material to be treated from the said vessel into the centrifugal through the bottom thereof, a diaphragm within the centrifugal, a casing provided with an outlet for receiving the solids discharged from the centrifugal, and vacuum creating means for withdrawing the separated liquid from the centrifugal and delivering the same to a suitable place of deposit.

In testimony whereof I have signed my name to this specification in the presence of two subscribing witnesses.

LAMARTINE C. TRENT.

Witnesses:
N. A. ACKER,
HARRY A. TOTTEN.